(12) United States Patent
Aljama et al.

(10) Patent No.: US 12,480,622 B2
(45) Date of Patent: Nov. 25, 2025

(54) SYSTEMS AND METHODS FOR GAS STORAGE

(71) Applicant: Saudi Arabian Oil Company, Dhahran (SA)

(72) Inventors: Hassan A. Aljama, Al Qatif (SA); Mohammed G. Hashim, Dammam (SA); Zainab S. Eid, Saihat (SA); Alassane Ndour, Dhahran (SA); Adnan Y. Almarzooq, Al Khobar (SA); Mark C. Bradbury, Al Khobar (SA); Rashid M. Othman, Al Khobar (SA); Yuguo Wang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 429 days.

(21) Appl. No.: 18/077,075

(22) Filed: Dec. 7, 2022

(65) Prior Publication Data

US 2024/0191840 A1 Jun. 13, 2024

(51) Int. Cl.
  *F17C 11/00* (2006.01)
  *F17C 13/04* (2006.01)

(52) U.S. Cl.
  CPC ............ *F17C 11/007* (2013.01); *F17C 13/04* (2013.01); *F17C 2221/033* (2013.01);
  (Continued)

(58) Field of Classification Search
  CPC .. F17C 11/007; F17C 13/04; F17C 2221/033; F17C 2227/0157; F17C 2250/0626; F17C 2260/024; F17C 2270/0581
  See application file for complete search history.

(56) References Cited

U.S. PATENT DOCUMENTS 6,475,411 B1 * 11/2002 Burchell ............... C01B 32/336
                                                    264/29.7
9,562,649 B2 *  2/2017 Wang ................. B01D 53/0462
                              (Continued)

FOREIGN PATENT DOCUMENTS

CN      113932564 A         2/2019
CN      119327416 A  *      1/2025 ............ C09K 5/063
                              (Continued)

OTHER PUBLICATIONS

SAIP Examination Report in Saudi Arabian Appln. No. 123450953, dated Nov. 2, 2024, 9 pages (with English translation).

*Primary Examiner* — Stephen Hobson
(74) *Attorney, Agent, or Firm* — Fish & Richardson P.C.

(57) ABSTRACT

The disclosure relates to systems and methods where an adsorption-based modularized gas storage system is integrated with existing off-network gas distribution pipelines, which can increase the system reliability and robustness for delivering gas. The modularized gas storage system is placed downstream of a natural gas producing well and upstream of a gas-based power plant. The modularized gas storage system can increase the capacity of the overall network, which can allow the pipeline network to absorb the fluctuations in gas demand with little if any need to adjust gas production rate and/or while sacrificing little if any survival time. The storage system can also release the stored gas in the case of an urgent need for gas (e.g., due to a shutdown of a natural gas producing well) to satisfy a desired survival time.

19 Claims, 3 Drawing Sheets

(52) U.S. Cl.
CPC ............... *F17C 2227/0157* (2013.01); *F17C 2250/0626* (2013.01); *F17C 2260/024* (2013.01); *F17C 2270/0581* (2013.01)

(56) References Cited

U.S. PATENT DOCUMENTS

| | | | | |
|---|---|---|---|---|
| 10,113,696 | B1* | 10/2018 | Bonelli | F02M 21/0221 |
| 10,302,254 | B2 | 5/2019 | Wang et al. | |
| 11,149,905 | B2* | 10/2021 | Wang | B01D 53/04 |
| 2010/0213083 | A1* | 8/2010 | Olander | F17C 11/00 |
| | | | | 222/6 |
| 2013/0283854 | A1* | 10/2013 | Wang | F25J 3/08 |
| | | | | 62/636 |
| 2015/0001101 | A1* | 1/2015 | Dolan | F17C 11/007 |
| | | | | 206/0.7 |
| 2015/0007584 | A1* | 1/2015 | Brunner | F17C 1/00 |
| | | | | 62/48.1 |
| 2015/0211684 | A1* | 7/2015 | Santos | F17C 11/007 |
| | | | | 137/1 |
| 2015/0258487 | A1* | 9/2015 | Hornbostel | B01J 20/3268 |
| | | | | 428/305.5 |
| 2016/0273713 | A1* | 9/2016 | Lee | F17C 11/007 |
| 2016/0346724 | A1* | 12/2016 | Wang | B01D 53/0446 |
| 2018/0216876 | A1* | 8/2018 | Kim | F25J 1/0245 |
| 2019/0063265 | A1* | 2/2019 | Sinatov | F01D 15/10 |
| 2020/0292133 | A1* | 9/2020 | Wang | B01J 20/28016 |
| 2021/0102666 | A1* | 4/2021 | Wang | F17C 11/007 |
| 2022/0219108 | A1* | 7/2022 | Alhashim | F17C 11/007 |
| 2024/0191840 | A1* | 6/2024 | Aljama | F17C 11/007 |
| 2025/0164075 | A1* | 5/2025 | Borup | F17C 5/06 |

FOREIGN PATENT DOCUMENTS

| | | | | |
|---|---|---|---|---|
| WO | WO 2011159259 | | 12/2011 | |
| WO | WO-2018192780 A1 * | 10/2018 | ............. | F17C 9/02 |

* cited by examiner

SYSTEMS AND METHODS FOR GAS STORAGE

FIELD

The disclosure relates to systems and methods where an adsorption-based modularized gas storage system is integrated with existing off-network gas distribution pipelines, which can increase the system reliability and robustness for delivering gas. The modularized gas storage system is placed downstream of a natural gas producing well and upstream of a gas-based power plant. The modularized gas storage system can increase the capacity of the overall network, which can allow the pipeline network to absorb the fluctuations in gas demand with little if any need to adjust gas production rate and/or while sacrificing little if any survival time. The storage system can also release the stored gas in the case of an urgent need for gas (e.g., due to a shutdown of a natural gas producing well) to satisfy a desired survival time.

BACKGROUND

It is typically desirable for a natural gas producing well to produce gas at a relatively constant flow rate because this can increase the lifetime of the natural gas well and maintain the integrity of the well. Adjustments to the natural gas production rate and/or shutting down wells in response to fluctuating power demands of a gas-based power plant connected to the natural gas wells can compromise the integrity of the natural gas producing wells, components of the natural gas producing wells and/or natural gas transportation systems.

SUMMARY

The disclosure relates to systems and methods where an adsorption-based modularized gas storage system is integrated with existing off-network gas distribution pipelines, which can increase the system reliability and robustness for delivering gas. The modularized gas storage system is placed downstream of a natural gas producing well and upstream of a gas-based power plant. The system can have a compressor upstream or downstream of the adsorption-based storage unit. The modularized gas storage system can increase the capacity of the overall network, which can allow the pipeline network to absorb the fluctuations in gas demand with little if any need to adjust gas production rate and/or while sacrificing little if any survival time (time of continuous gas supply to meet natural gas demand needs upon sudden shutdown in the natural gas production facility (wells)). The storage system can also release the stored gas in the case of an urgent need for gas (e.g., due to a shutdown of a natural gas producing well) to satisfy a desired survival time.

The systems and methods of the disclosure can increase system reliability and/or robustness for delivering gas by increasing storage capacity. Introducing relatively new factors (e.g., renewable energy sources) into existing power plants that are directly connected to natural gas producing facilities via a limited pipeline network can result in gas demand fluctuations unaccounted for in the design and demand swings that may not be absorbed by the existing pipeline network. This can involve adjusting the rate of natural gas production from the wells, which can impact the integrity of the wells (e.g., via sand carryovers and/or relatively frequent shutdowns). The systems and methods can increase the storage capacity of off-network gas distribution pipelines to absorb demand fluctuations, such as fluctuations due to the introduction of renewable energy sources to the power producing facility, reduce adjustments to the flow rate of produced natural gas, and release gas to meet demand.

The systems and methods typically include a porous adsorbent packed in an adsorption vessel for gas storage, which can increase the natural gas content in the vessel over three times relative to an adsorbent-free vessel at the same pressure. The systems and methods can have a relatively small physical footprint relative to other methods of increasing the natural gas storage capacity (e.g., pipeline looping). Thus, for example, the systems and methods can be applied when there is a limited pipeline distribution network between the natural gas producing well and the gas-based power producing facility.

The adsorption vessel of the systems and methods can be operated at a lower pressure (e.g., less than 500 psi, less than 400 psi, less than 300 psi) than typical operating conditions of a natural gas producing well (e.g., at least 800 psi) and at a relatively low discharge pressure of natural gas (e.g., at least 5 psi and/or at most 200 psi). In the lower pressure range, the ratio of storage capacity between adsorbed natural gas (adsorbed in the gas storage system) to compressed natural gas (in a pipeline) can increase to more than a factor of three, making the process more practical as a larger amount of gas can be stored. The adsorption vessel of the systems and methods can also receive gas at a relatively high pressure (e.g., at most 900 psi), allowing for use with pipelines under high pressure.

The systems and methods can reduce (e.g., avoid) the use of a heat management system, which can reduce the technical requirements, reduce costs and/or simplify the systems and methods. This can be due to the fact that the relatively slow dynamics of the process (e.g., slow charging of the vessels) can mitigate the need for an extended heat management system to control the temperature of the adsorption vessel.

The systems and methods can act as an emergency storage system, for example by providing natural gas in case of a shutdown to the natural gas producing well(s). The systems and methods can be operated at lower pressures relative to certain other known systems and methods, which can provide better capacitance to absorb pressure fluctuations during demand swings and/or reduce stress on pipelines.

In a first aspect, the disclosure provides a system, including a natural gas source, a gas-based power plant, an adsorption-based gas storage unit, a first pipeline connecting the natural gas source and the gas-based power plant, a first valve, and a second valve. In a first position, the first valve permits fluid communication between the natural gas source and the adsorption-based gas storage unit. In a second position, the first valve prohibits fluid communication between the natural gas source and the adsorption-based gas storage unit. In a first position, the second valve permits fluid communication between the adsorption-based gas storage unit and the gas-based power plant. In a second position, the second valve prohibits fluid communication between the adsorption-based gas storage unit and the gas-based power plant. The adsorption-based gas storage unit is configured to release gas when a difference in pressure between the adsorption-based gas storage unit and the gas-based power plant is at least 200 psi.

In some embodiments, the adsorption-based gas storage unit does not include a heat management system.

In some embodiments, the system further includes a controller configured to control the position of the first and second valves.

In some embodiments, the controller is configured so that, when the difference in pressure between the adsorption-based gas storage unit and the gas-based power plant is at least 200 psi the first valve is in its second position and the second valve is in its first position.

In some embodiments, the system further includes second and third pipelines. The second pipeline is connected to the first pipeline at a first location along the first pipeline and the adsorption-based gas storage unit. The first valve is located along the second pipeline between the first pipeline and the adsorption-based gas storage unit. The third pipeline is connected to the first pipeline at a second location along the first pipeline and the adsorption-based gas storage unit. The second valve is located along the third pipeline between the adsorption-based gas storage unit and the first pipeline. The first location is upstream of the second location.

In some embodiments, the system further includes a compressor configured to increase a pressure of gas present in the second pipeline.

In some embodiments, the system further includes a compressor configured to increase a pressure of gas present in the third pipeline.

In some embodiments, the adsorption-based gas storage unit includes a plurality of adsorption beds configured to store gas.

In some embodiments, the adsorption-based gas storage unit has a storage capacity of 2 to 4 times the storage capacity of the first pipeline.

In some embodiments, the system is configured so that the adsorption-based gas storage unit fully charges in 0.25 to 2 days.

In some embodiments, the adsorption-based gas storage unit is configured to supply the gas-based power plant with gas for 1 hour to 8 hours.

In some embodiments, the system is configured so that the adsorption-based gas storage unit supplies gas to the gas-based power plant when the gas producing well stops producing gas. In some embodiments, the natural gas source includes a gas producing well.

In a second aspect, the disclosure provides a system, including a natural gas source, a gas-based power plant, an adsorption-based gas storage unit, a first pipeline connecting the natural gas source and the gas-based power plant, a first valve, and a second valve. In a first position, the first valve permits fluid communication between the natural gas source and the adsorption-based gas storage unit. In a second position, the first valve prohibits fluid communication between the natural gas source and the adsorption-based gas storage unit. In a first position, the second valve permits fluid communication between the adsorption-based gas storage unit and the gas-based power plant. In a second position, the second valve prohibits fluid communication between the adsorption-based gas storage unit and the gas-based power plant. The adsorption-based gas storage unit does not include a heat management system.

In some embodiments, the system further includes a controller configured to control the position of the first and second valves.

In a third aspect, the disclosure provides a method, including: adsorbing excess gas produced from a natural gas source in an adsorption-based gas storage unit and releasing the gas in the adsorption-based gas storage unit to a gas-based power plant based on a pressure differential between the adsorption-based gas storage unit and the gas-based power plant configured to receive the gas released from the adsorption-based gas storage unit.

In certain embodiments, the method includes releasing the gas in the adsorption-based gas storage unit when the pressure differential between the adsorption-based gas storage unit and the gas-based power plant is 200 psi to 800 psi.

In certain embodiments, the method further includes releasing the gas in the adsorption-based gas storage unit so that a production rate of the gas-based power plant does not vary as a demand for gas from the gas-based power plant varies.

In certain embodiments, the method further includes releasing the gas in the adsorption-based gas storage unit when the natural gas source shuts down.

In certain embodiments, releasing the gas from the adsorption-based gas storage unit does not include heating the gas.

DETAILED DESCRIPTION

Figure 1:
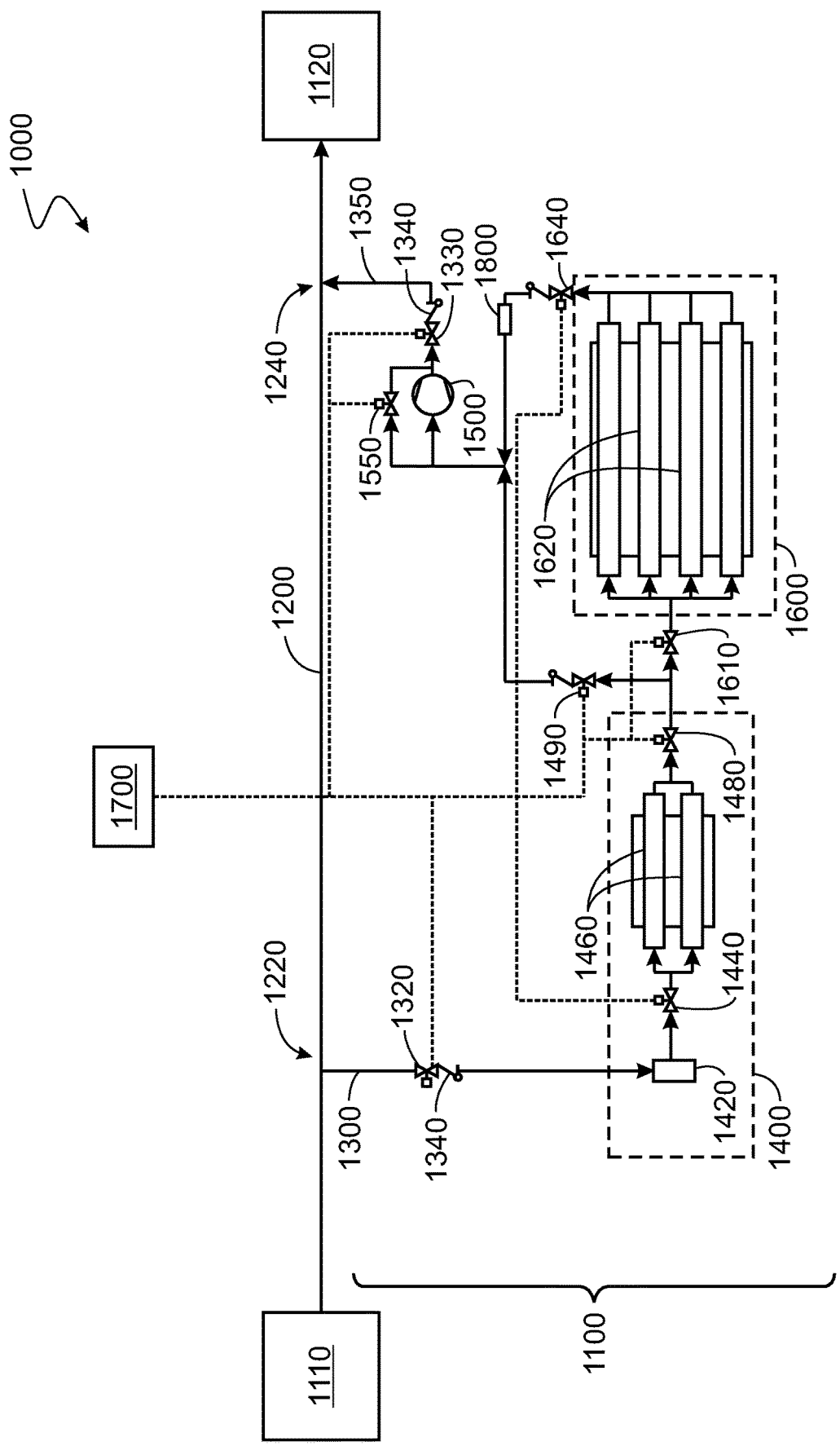
FIG. 1 depicts a schematic of a system.

FIG. 1 depicts a system 1000 including a natural gas storage facility 1100, a natural gas producing well 1110 and a natural gas based power producing facility 1120. A natural gas pipeline (e.g., a compressed natural gas pipeline) 1200 connects the natural gas producing well 1110 and the power producing facility 1120. The natural gas storage facility 1100 couples to the pipeline 1200 at an upstream connection point 1220 and a downstream connection point 1240. An upstream isolation valve 1320 and downstream isolation valve 1330 can fluidly isolate the natural gas storage facility 1100 from the pipeline 1200 upon closing. Check valves 1340 provide additional assurance that any fluid flow through natural gas storage facility 1100 is one-way from the upstream connection point 1220 to the downstream connection point 1240.

A guard bed system 1400 (dashed outline) couples to the pipeline 1200 through an inlet conduit 1300. The guard bed system 1400 includes an impurity separator 1420 and a two guard adsorbers 1460. FIG. 1 shows two separate guard adsorbers 1460 in a parallel configuration. The impurity separator 1420 operates to remove natural gas impurities from incoming natural gas. The impurity separator 1420 couples to the guard adsorbers 1460 through a guard adsorber inlet isolation valve 1440. The guard adsorber 1460 separates incoming natural gas into heavy natural gas components and light natural gas components and retains the heavy natural gas component during the storage period. The guard bed system 1400 has a guard adsorber outlet isolation valve 1480 at the flow outlet of guard adsorber 1460.

The guard bed system 1400 fluidly couples to an adsorption bed system 1600 (dashed outline) through the guard adsorber outlet isolation valve 1480 and an adsorption bed inlet isolation valve 1610. FIG. 1 shows the adsorption bed system 1600 having four separate adsorption beds 1620 in parallel. Each adsorption bed 1620 contains the natural gas adsorbent (not shown) for retaining the light natural gas component during the storage period. Desorbed light natural gas component passes from the adsorption bed 1620 through an adsorption bed outlet isolation valve 1640. A pressure control valve 1800 controls the discharge pressure of the adsorption bed 1620.

The guard bed system 1400 couples to both a storage facility compressor 1500 and a compressor bypass valve 1550 through the guard bed discharge isolation valve 1490. The adsorption bed system 1600 also couples to the storage facility compressor 1500 and the compressor bypass valve 1550 via the adsorption bed outlet isolation valve 1640. Both the storage facility compressor 1500 and the compressor bypass valve 1550 provide access to the pipeline 1200 from the guard adsorbers 1460 and the adsorption beds 1620. The storage facility compressor 1500 is operable to pressurize and introduce the released heavy natural gas component and the released light natural gas component, either separately or together, into the pipeline 1200 through a discharge conduit 1350. The compressor bypass valve 1550 permits access to the pipeline 1200 through the discharge conduit 1350. The storage facility compressor 1500 is operable to reduce the pressure in the guard adsorbers 1460 and the adsorption beds 1620 separately or simultaneously depending on valve configuration to facilitate desorption.

The system includes a controller 1700 in signal communication with each of the valves 1320, 1330, 1440, 1480, 1490, 1550, 1610, and/or 1640. The controller 1700 controls the state (open or closed) of each of the valves 1320, 1330, 1440, 1480, 1490, 1550, 1610, and/or 1640 as appropriate. The controller 1700 may be used to provide more robust process control and higher efficiency.

In some embodiments, the controller 1700 may be a separate unit mounted in a desired location, such as a programmable logic controller (PLC), for example, as part of a supervisory control and data acquisition (SCADA) or Fieldbus network. In certain embodiments, the controller 1700 may interface to a distributed control system (DCS) installed in a control center (e.g., a central control center). In some embodiments, the controller 1700 may be a virtual controller running on a processor in a DCS, on a virtual processor in a cloud server, or using other real or virtual processors.

In some embodiments, the controller 1700 includes a processor. The processor may be any appropriate processor, such as, for example, a microprocessor, a multi-core processor, a multithreaded processor, an ultra-low-voltage processor, an embedded processor, or a virtual processor. The processor may be part of a system-on-a-chip (SoC) in which the processor and other components are formed into a single integrated package. In various embodiments, the processor may include processors from, for example, Intel® Corporation of Santa Clara, California, from Advanced Micro Devices, Inc. (AMD) of Sunnyvale, California, or from ARM holdings, LTD., of Cambridge England. Any number of other processors from other suppliers may also be used.

In some embodiments, the processor may communicate with other components of the controller 1700 over a bus. The bus may include any number of technologies, such as industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus technologies may be used, in addition to, or instead of, the technologies above. For example, plant interface systems may include I2C buses, serial peripheral interface (SPI) buses, Fieldbus, and the like.

In some embodiments, the bus may couple the processor to a memory. In some embodiments, such as in PLCs and other process control units, the memory is integrated with a data store used for long-term storage of programs and data. The memory includes any number of volatile and nonvolatile memory devices, such as volatile random-access memory (RAM), static random-access memory (SRAM), flash memory, and the like. In smaller devices, such as PLCs, the memory may include registers associated with the processor itself. The data store is used for the persistent storage of information, such as data, applications, operating systems, and so forth. The data store may be a nonvolatile RAM, a solid-state disk drive, or a flash drive, among others. In some embodiments, the data store will include a hard disk drive, such as a micro hard disk drive, a regular hard disk drive, or an array of hard disk drives, for example, associated with a DCS or a cloud server.

In some embodiments, the bus couples the controller 1700 to a controller interface. The controller interface may be an interface to a plant bus, such as a Fieldbus, an I2C bus, an SPI bus, and the like.

In some embodiments, a local human machine interface (HMI) may be used to input control parameters. The local HMI may be coupled to a user interface, including, for example, a display that includes a multiline LCD display, or a display screen, among others. The user interface may also include a keypad for the entry of control parameters, such as the starting parameters for the flow of the lean solvent into the contactor. Generally, the controller 1700 will either be part of a plant control system, such as a DCS, or coupled through a plant bus system to the plant control system.

In some embodiments, the controller 1700 is linked to a control system for the system 1000 and/or 2000 through a network interface controller (NIC). The NIC can be an Ethernet interface, a wireless network interface, or a plant bus interface, such as Fieldbus.

In some embodiments, the data store includes blocks of stored instructions that, when executed, direct the processor to implement the control functions for the system 1000 and/or 2000. The data store includes a block of instructions to direct the processor to open and close the valves 1320, 1330, 1440, 1480, 1490, 1550, 1610, and/or 1640 as appropriate.

During the storage period, a detectable condition triggers the controller 1700 to operate the isolation valves, including the upstream isolation valve 1320, the guard adsorber inlet isolation valve 1440, the guard adsorber outlet isolation valve 1480 and the adsorption bed inlet isolation valve 1610, such that a fluid pathway forms between the pipeline 1200, the guard bed system 1400 and the adsorption bed system 1600.

Pressure differences between the pipeline 1200 and the guard bed system 1400 motivates natural gas to flow from the pipeline 1200 into the impurity separator 1420. The impurity separator 1420 operates to remove any impurities in the introduced natural gas before it passes into the guard adsorbers 1460. A pressure differential motivates the introduced natural gas to flow from the impurity separator 1420 into one or more of the guard adsorbers 1460. At reduced temperatures and increasing pressure (as more natural gas flows into natural gas storage facility 1100), the heavy natural gas component of the introduced natural gas is selectively separated from the introduced natural gas and is retained in the guard adsorber 1460. The light natural gas component forms as a residual of the separated natural gas. The light natural gas component passes from the guard bed system 1400 and into one or more of the adsorption beds 1620. The natural gas adsorbent adsorbs the light natural gas component. In some embodiments, the natural gas adsorbent adsorbs the heavy natural gas component in addition to the light natural gas component.

Either at the end of the storage period or when some other detectable condition occurs and is detected, the upstream isolation valve 1320, the guard adsorber inlet isolation valve 1440, the guard adsorber outlet isolation valve 1480 and the adsorption bed inlet isolation valve 1610 are closed by the controller 1700 to isolate the natural gas storage facility 1100 from the pipeline 1200.

During the release period, a condition detected by the natural gas storage facility 1100 causes the controller 1700 to operate the isolation valves, including the guard adsorber outlet isolation valve 1480, the adsorption bed outlet isolation valve 1640, the guard bed discharge isolation valve 1490 and the downstream isolation valve 1330, such that the fluid pathways between both the guard bed system 1400 and the adsorption bed system 1600 and the pipeline 1200 form. The pressure differential between the natural gas storage facility 1100 and a downstream component of the pipeline 1200 causes the release of stored gas. In general, temperature has a minimal effect on the release of stored gas.

Generally, the adsorption beds 1620 are charged at high pressure and depressurized at a low pressure. Introduction of the desorbed natural gas components into the pipeline 1200 from the guard adsorbers 1460 and/or the adsorption beds 1620 occurs without the need of compressive assistance by opening the compressor bypass valve 1550.

A suitable difference in pressure between the guard bed system 1400 and the pipeline 1200 causes the released heavy natural gas component to flow from the guard bed system 1400 into the pipeline 1200. Similarly, a suitable difference in pressure between the adsorption bed system 1600 and the pipeline 1200 causes desorbed light natural gas components to flow from the adsorption bed system 1600 into the pipeline 1200. Otherwise, closing the compressor bypass valve 1550 and operating the storage facility compressor 1500 provides the motivation to the released natural gas components.

The storage facility compressor 1500 allows the release of gas from the adsorption bed system 1600 at pressures below the pipeline 1200 pressure. Most of the gas in the adsorption bed system 1600 can be released and the storage facility compressor 1500 pressurizes the gas to the pressure of the pipeline 1200.

The adsorption beds 1620 are filled with a porous solid material with a high affinity to methane. The porous material increases the volume of gas stored per vessel. Examples of adsorbent materials include activated carbon and metal organic frameworks (MOFs). In certain embodiments, the natural gas storage facility 1100 has a storage capacity of at least 2 (e.g., at least 2.5, at least 3, at least 3.5) times the storage amount of gas stored in the pipeline 1200 and/or at most 4 (e.g., at most 3.5, at most 3, at most 2.5) time the storage amount of gas stored in the pipeline 1200.

Figure 2:
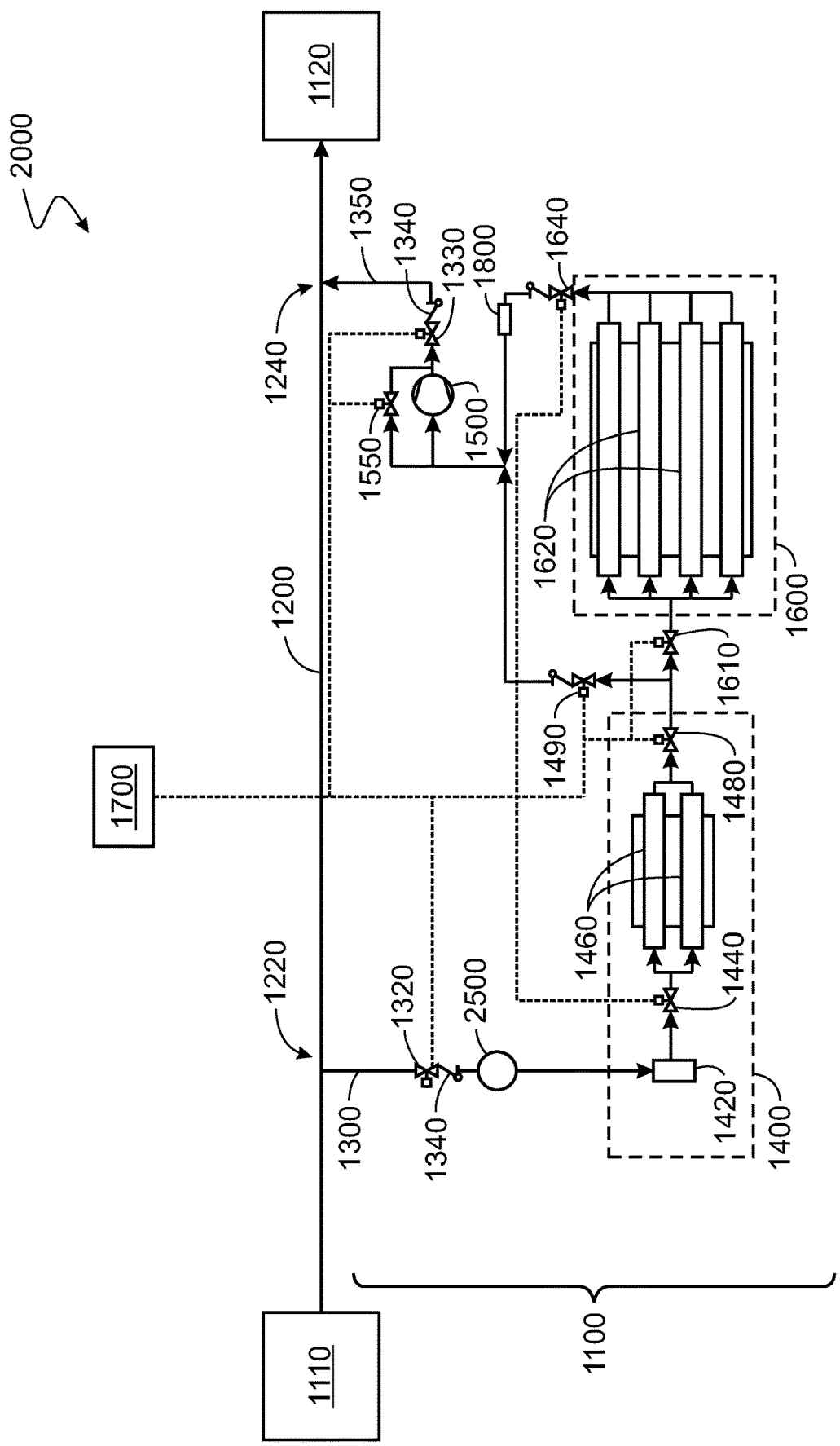
FIG. 2 depicts a schematic of a system.

FIG. 2 depicts a system containing the components of the system 1000 of FIG. 1, as well as a compressor 2500 on the inlet conduit 1300 downstream of the upstream isolation valve 1320. Storage of natural gas through adsorption increases as a function of pressure. In some embodiments, the pressure upstream of the natural gas storage facility 1100 is not sufficiently high, and compression is desirable to increase the pressure to allow a higher gas storage capacity. The compressor 2500 can be used to provide such increased pressure.

The systems 1000 and 2000 do not contain a heat management system and/or components of a heat management system (e.g., a thermal jacket for the guard adsorbers 1460 and/or the adsorption beds 1620, a temperature control system) because the relatively slow charging of natural gas into the adsorption bed 1620 alleviates the need for a heat management system. For example, because the adsorption beds 1620 are slowly charged rather than rapidly charged, a sudden rise in temperature from heat generated during the endothermic adsorption process does not occur. The pressure difference between the pipeline 1200 and the outlet of the upstream isolation valve 1320 drives charging. Gradual charging leads to an incremental increase in temperature that can be dissipated through natural convection. In some embodiments, the natural gas storage facility 1100 can be fully charged over a period of at least 0.25 (e.g., at least 0.5, at least 0.75, at least 1, at least 1.25, at least 1.5, at least 1.75) days and/or at most 2 (e.g., at most 1.75, at most 1.5, at most 1.25, at most 1, at most 0.75, at most 0.5) days.

The pressure differential between the natural gas storage facility 1100 and the pressure of the power producing facility 1120 is the driving force of the release of gas. Temperature differences have a minimal effect on the release of gas. In some embodiments, the pressure differential is at least 200 (e.g., at least 300, at least 400, at least 500, at least 600, at least 700) psi and/or at most 800 (e.g., at most 700, at most 600, at most 500, at most 400, at most 300) psi.

The natural gas storage facility 1100 can meet natural gas demand of the power producing facility 1120 upon a sudden shutdown of the natural gas producing well 1110 (i.e. survival time). In certain embodiments, the natural gas storage facility 1100 can provide natural gas to the power producing facility 1120 for at least 1 (e.g., at least 2, at least 3, at least 4, at least 5, at least 6, at least 7) hours and/or at most 8 (e.g., at most 7, at most 6, at most 5, at most 4, at most 3, at most 2) hours upon shutdown of the natural gas producing well 1110.

In some embodiments, compression is not used upstream or downstream of the natural gas storage facility 1100. In some embodiments, the natural gas storage facility 1100 receives natural gas from the natural gas producing well 1110 at a relatively high pressure (e.g., at least 400 psi and/or at most 1000 psi). In some embodiments, the system can include a regulator downstream the natural gas producing well and upstream the gas-based power producing facility to control the flow rate to the natural gas storage facility 1100. In some embodiments, the upstream isolation valve 1320 acts as a regulator. In some embodiments, the natural gas storage facility 1100 releases natural gas, when needed, to the power producing facility 1120 at the operating pressure needed to run the gas-based power plant (e.g., at least 150 psi and/or at most 200 psi).

In some embodiments, the natural gas storage facility 1100 receives natural gas from the natural gas producing well 1110 at a pressure of at least 400 (e.g., at least 500, at least 600, at least 700, at least 800, at least 900) psi and/or at most 1000 (e.g., at most 900, at most 800, at most 700, at most 600, at most 500) psi. In some embodiments, the natural gas storage facility 1100 receives natural gas from the natural gas producing well 1110 at a temperature of at least 60 (e.g., at least 70, at least 80, at least 90, at least 100, at least 110) ° F. and/or at most 120 (e.g., at most 110, at most 100, at most 90, at most 80, at most 70) ° F.

In some embodiments, the natural gas storage facility 1100 releases natural gas to the power producing facility 1120 at a pressure of at least 150 (e.g., at least 160, at least 170, at least 180, at least 190) psi and/or at most 200 (e.g., at most 190, at most 180, at most 170, at most 160) psi. In some embodiments, natural gas storage facility 1100 releases natural gas to the power producing facility 1120 at a temperature of at least 60 (e.g., at least 70, at least 80, at least 90, at least 100, at least 110) ° F. and/or at most 120 (e.g., at most 110, at most 100, at most 90, at most 80, at most 70) ° F.

In some embodiments, compression is used downstream of the natural gas storage facility 1100 and upstream of the power producing facility 1120. In some embodiments, the natural gas storage facility 1100 releases natural gas to the power producing facility 1120 at a relatively low pressure (e.g., at least 5 psi and/or at most 40 psi). In such embodiments, the storage facility compressor 1500 pressurizes the natural gas to the operating pressure needed to run the power producing facility 1120 (e.g., at least 80 psi and/or at most 200 psi). In some embodiments, the natural gas storage facility 1100 releases natural gas to the power producing facility 1120 at a pressure of at least 5 (e.g., at least 10, at least 15, at least 20, at least 25, at least 30, at least 35) psi and/or at most 40 (e.g., at most 35, at most 30, at most 25, at most 20, at most 15, at most 10) psi prior to compression in the storage facility compressor 1500. In some embodiments, the power producing facility 1120 receives gas from the natural gas storage facility 1100 at a pressure of at least 150 (e.g., at least 160, at least 170, at least 180, at least 190) psi and/or at most 200 (e.g., at most 190, at most 180, at most 170, at most 160) psi after compression in the storage facility compressor 1500.

In some embodiments, compression is used upstream of the natural gas storage facility 1100 and downstream of the natural gas producing well 1110. In some embodiments, the compressor 2500 receives natural gas at a first pressure (e.g., at least 400 psi to at most 600 psi) from the natural gas producing well 1110 and pressurizes it to a relatively high pressure (e.g., at least 700 psi and/or at most 900 psi).

In some embodiments, the natural gas producing well 1110 releases gas to the natural gas storage facility 1100 at a pressure of at least 400 (e.g., at least 450, at least 500, at least 550) psi and/or at most 600 (e.g., at most 550, at most 500, at most 450) psi prior to compression in the compressor 2500. In some embodiments, the natural gas storage facility 1100 receives natural gas from the natural gas producing well 1110 at a pressure of at least 700 (e.g., at least 750, at least 800, at least 850) psi and/or at most 900 (e.g., at most 850, at most 800, at most 750) psi after compression in the compressor 2500.

Figure 3:
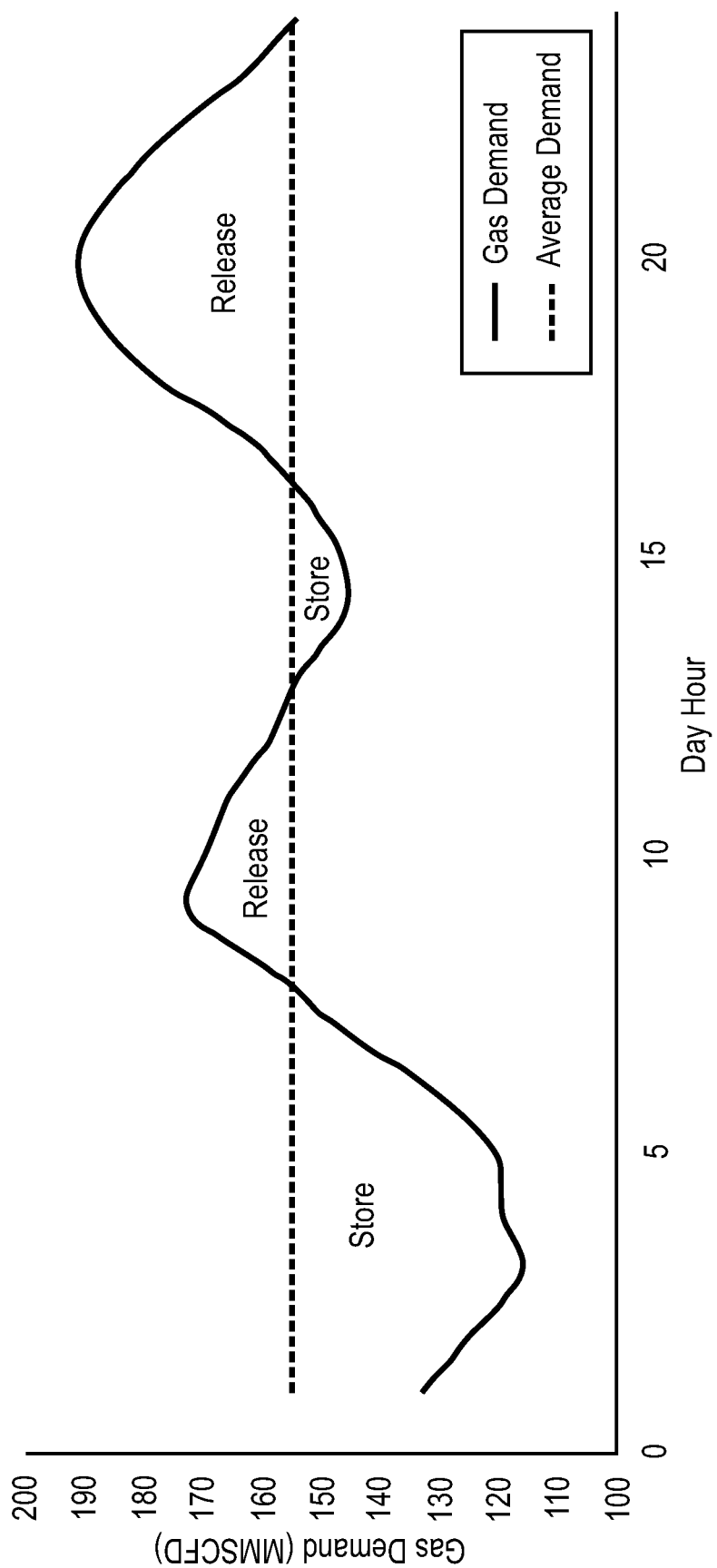
FIG. 3 depicts simulated data of gas demand over time.

Production of natural gas at a constant flow rate from wells extends the lifetime of the wells and minimizes the need for human intervention during the operation. FIG. 3 shows sales gas (salable natural gas treated to remove water vapor, inert gases, carbon dioxide, hydrogen sulfide and/or natural gas liquids) demand during a 24-hour cycle of a gas-based power plant (see Example 1 below). The natural gas storage facility 1100 is installed next to the natural gas producing well 1110 to allow sales gas production at a near constant flow rate. The natural gas storage facility 1100 extends the overall capacity of the system, allowing the pipeline network to absorb the fluctuations in the sales gas demand (which is reflected through changing the pressure in the pipeline). Since the natural gas producing well 1110 is directly connected to power producing facility 1120, the natural gas storage facility 1100 significantly reduces the footprint needed compared using compressed natural gas in pipelines to provide the same storage capacity.

EXAMPLES

Example 1—Storage Units Coupled with Compression to Allow Constant Gas Supply from Wells The demand profile in FIG. 3 involves a storage capacity of 9 MMSCF as calculated by measuring the storage requirement from the demand profiles. The number of vessels used depends on the adsorption capacity of the material, the size of vessel, and the operating conditions. For a pressure upstream of a metering station located between the upstream connection point 1220 and the downstream connection point 1240 of 450 psi, a gas-based power plant inlet pressure of 150 psi, and an adsorption capacity of the material of 65 (v/v) at 450 psi and 2 (v/v) at 5 psi, an adsorption vessel with a total volume of 600 m$^3$ can store 1.3 MMSCF at a pressure of 450 psi as obtained from the adsorption isotherm that showed a 65 (v/v) storage capacity at 450 psi.

Thus, a total of 7 adsorption bed 1620 in parallel are involved to satisfy the storage requirement. Compression is used to pressurize the natural gas downstream from the gas storage facility from 5 psi to 150 psi (required pressure for the gas-based power plant) as the lower release pressure causes a larger amount of stored gas to be released.

Example 2—Storage Units without Compression Requirement to Allow Constant Gas Supply from the Wells An alternative to Example 1 are storage units without the use of compression. The demand profile in FIG. 3 involves a storage capacity of 9 MMSCF. The number of vessels used depends on the adsorption capacity of the material, the size of vessel, and the operating pressures. For a pressure upstream the metering station of 450 psi, a gas-based power plant inlet pressure of 150 psi, and an adsorption capacity of the material is 65 (v/v) at 450 psi and 30 (v/v) at 150 psi, an adsorption vessel of a total volume of 600 m$^3$ can store 0.7 MMSCF at a pressure of 450 psi as obtained from the adsorption isotherm that showed a 65 (v/v) storage capacity at 450 psi.

Thus, a total of 13 adsorption bed 1620 in parallel are used to satisfy the storage requirement. The gas was released at a pressure of 155 psi. Compression is not required here since outlet pressure is close the required pressure of the gas-based power plant.

Example 3—Lowering Operating Pressure in the Pipeline to Absorb Demand Fluctuations The storage facilities can be used as an alternative to packing the pipelines to meet the survival time requirement. For a pipeline length between the production facility and the power plant of 100 km, an inlet pressure of 450 psig, an outlet pressure of 150 psig, an operating temperature of 100° F., and a flow rate to the gas-based power plant of 100 MMSCFD, the survival time is 7 hours as calculated using the ideal gas equation and taking into account the pipeline length and diameter (30 inch), and that gas would be continuously supplied at a rate of 100 MMSCF.

High inlet pressure of 450 psi of the pipeline 1200 causes pressure fluctuations to be absorbed by the wells. Reducing the pressure to 400 psig reduces the survival time by 2 hours. The two hours loss in survival time is mitigated by installing storage units as illustrated in FIG. 1 or FIG. 2.

If the configuration is similar to the schematic of FIG. 1, without the use of compression, it would require 12 vessels for gas storage.

However, if the system is configured with downstream compression as shown in FIG. 1, it would require 7 vessels to absorb fluctuations.

The calculations show that fluctuations in sales gas demand can be absorbed by the pipeline network without compromising the survival time (which is met through the adsorption-based storage system) while avoiding the need to continuously adjust the flow rate of gas production.

OTHER EMBODIMENTS

While certain embodiments have been disclosed above, the disclosure is not limited to such embodiments.

As an example, the system 1000 and/or 2000 can include a natural gas processing facility to remove water vapor, inert gases, carbon dioxide, hydrogen sulfide and/or natural gas liquids from the natural gas produced by the natural gas producing well 1110 to form sales gas. In some embodiments, the natural gas processing facility is upstream of the natural gas storage facility 1100. In such an embodiment, the natural gas storage facility 1100 adsorbs sales gas from the natural gas processing facility and releases the sales gas to the power producing facility 1120.

As another example, the system 1000 and/or 2000 may not include every component shown. The system 1000 and/or 2000 can operate without the guard bed system 1400.

What is claimed:

1. A system, comprising:
    a natural gas source;
    a gas-based power plant;
    an adsorption-based gas storage unit;
    a first pipeline connecting the natural gas source and the gas-based power plant;
    a first valve; and
    a second valve,
    wherein:
        in a first position, the first valve permits fluid communication between the natural gas source and the adsorption-based gas storage unit;
        in a second position, the first valve prohibits fluid communication between the natural gas source and the adsorption-based gas storage unit;
        in a first position, the second valve permits fluid communication between the adsorption-based gas storage unit and the gas-based power plant;
        in a second position, the second valve prohibits fluid communication between the adsorption-based gas storage unit and the gas-based power plant;
        the adsorption-based gas storage unit is configured to release gas when a difference in pressure between the adsorption-based gas storage unit and the gas-based power plant is at least 200 psi; and
        the adsorption-based gas storage unit does not comprise a heat management system.

2. The system of claim 1, further comprising a controller configured to control the position of the first and second valves.

3. The system of claim 2, wherein the controller is configured so that, when the difference in pressure between the adsorption-based gas storage unit and the gas-based power plant is at least 200 psi:
    the first valve is in the first valve's second position; and
    the second valve is in the second valve's first position.

4. The system of claim 2, further comprising second and third pipelines, wherein:
    the second pipeline is connected to the first pipeline at a first location along the first pipeline and the adsorption-based gas storage unit;
    the first valve is located along the second pipeline between the first pipeline and the adsorption-based gas storage unit;
    the third pipeline is connected to the first pipeline at a second location along the first pipeline and the adsorption-based gas storage unit;
    the second valve is located along the third pipeline between the adsorption-based gas storage unit and the first pipeline; and
    the first location is upstream of the second location.

5. The system of claim 4, further comprising a compressor configured to increase a pressure of gas present in the second pipeline.

6. The system of claim 4, further comprising a compressor configured to increase a pressure of gas present in the third pipeline.

7. The system of claim 1, further comprising second and third pipelines, wherein:
    the second pipeline is connected to the first pipeline at a first location along the first pipeline and the adsorption-based gas storage unit;
    the first valve is located along the second pipeline between the first pipeline and the adsorption-based gas storage unit;
    the third pipeline is connected to the first pipeline at a second location along the first pipeline and the adsorption-based gas storage unit;
    the second valve is located along the third pipeline between the adsorption-based gas storage unit and the first pipeline; and
    the first location is upstream of the second location.

8. The system of claim 7, further comprising a compressor configured to increase a pressure of gas present in the second pipeline.

9. The system of claim 7, further comprising a compressor configured to increase a pressure of gas present in the third pipeline.

10. The system of claim 7, wherein the adsorption-based gas storage unit comprises a plurality of adsorption beds configured to store gas.

11. The system of claim 7, wherein the adsorption-based gas storage unit has a storage capacity of 2 to 4 times the storage capacity of the first pipeline.

12. The system of claim 11, wherein the system is configured so that the adsorption-based gas storage unit fully charges in 0.25 to 2 days.

13. The system of claim 12, wherein the adsorption-based gas storage unit is configured to supply the gas-based power plant with gas for 1 hour to 8 hours.

14. The system of claim 1, wherein the adsorption-based gas storage unit comprises a plurality of adsorption beds configured to store gas.

15. The system of claim 1, wherein the adsorption-based gas storage unit has a storage capacity of 2 to 4 times the storage capacity of the first pipeline.

16. The system of claim 15, wherein the system is configured so that the adsorption-based gas storage unit fully charges in 0.25 to 2 days.

17. The system of claim 16, wherein the adsorption-based gas storage unit is configured to supply the gas-based power plant with gas for 1 hour to 8 hours.

18. The system of claim 17, wherein:
    the natural gas source comprises a gas producing well; and
    the system is configured so that the adsorption-based gas storage unit supplies gas to the gas-based power plant when the gas producing well stops producing gas.

19. The system of claim 1, wherein the natural gas source comprises a gas producing well.

\* \* \* \* \*